(12) United States Patent
Hsiao

(10) Patent No.: US 6,718,548 B1
(45) Date of Patent: Apr. 6, 2004

(54) METHOD FOR EMBEDDING AN OPERATING SYSTEM AND AN APPLICATION PROGRAM INTO A MEMORY APPARATUS

(75) Inventor: Sung Feng Hsiao, Taipei (TW)

(73) Assignee: Steptech, Inc., Taipei (TW)

( * ) Notice: Subject to any disclaimer, the term of this patent is extended or adjusted under 35 U.S.C. 154(b) by 556 days.

(21) Appl. No.: 09/669,562

(22) Filed: Sep. 26, 2000

(30) Foreign Application Priority Data

Jun. 8, 2000 (TW) ........................................ 89111198 A

(51) Int. Cl.[7] ................. G06F 9/445; G06F 9/00; G06F 12/00
(52) U.S. Cl. .................. 717/174; 717/175; 717/176; 717/178; 713/1; 711/103
(58) Field of Search .................... 711/162, 103; 714/1–24; 717/174, 175, 176, 178; 713/1

(56) References Cited

U.S. PATENT DOCUMENTS

| | | | | |
|---|---|---|---|---|
| 6,205,527 B1 | * | 3/2001 | Goshey et al. | 711/162 |
| 6,212,632 B1 | * | 4/2001 | Surine et al. | 713/2 |
| 6,349,375 B1 | * | 2/2002 | Faulkner et al. | 711/173 |
| 6,374,266 B1 | * | 4/2002 | Shnelvar | 707/204 |
| 6,434,648 B1 | * | 8/2002 | Assour et al. | 710/305 |
| 6,434,695 B1 | * | 8/2002 | Esfahani et al. | 713/2 |
| 6,477,629 B1 | * | 11/2002 | Goshey et al. | 711/162 |
| 6,480,944 B2 | * | 11/2002 | Bradshaw et al. | 711/162 |
| 6,546,489 B1 | * | 4/2003 | Frank, Jr. et al. | 713/187 |

* cited by examiner

Primary Examiner—Todd Ingberg
Assistant Examiner—Qamrun Nahar
(74) Attorney, Agent, or Firm—Rabin & Berdo, P.C.

(57) ABSTRACT

A method for embedding an operating system and application program into a memory apparatus. The operating system includes a boot file and a run control (RC) program and the method includes the steps as follows. First, source codes of the operating system are processed for obtaining a crunch file of the operating system by applying a crunch technique. The crunch file of the operating system is then compiled, resulting in an executable file of the operating system which is then compressed into a system compression file. Next, eliminating unnecessary comments and settings from source codes of the application program, a compact version of the application program is obtained. Following that, a program storage file is mounted as a mount point through a virtual node technique. Next, the compact version of the application program is copied to the mount point. The program storage file is then compressed into a program compression file. After that, the memory apparatus is formatted and the boot file, the system compression file, and the program compression file are copied to the formatted memory apparatus.

22 Claims, 4 Drawing Sheets

METHOD FOR EMBEDDING AN OPERATING SYSTEM AND AN APPLICATION PROGRAM INTO A MEMORY APPARATUS

BACKGROUND OF THE INVENTION

This application incorporates by reference Taiwanese application Serial No. 89111198, filed Jun. 8, 2000.

1. Field of the Invention

The invention relates in general to a method for the embedding of bootable programs into a memory apparatus, and more particularly to a method for the embedding of an operating system and an application program into a memory apparatus.

2. Description of the Related Art

As computer systems are used more widely, the number of users increases as well. For the management of users in a common working environment such as a local area network in a school or company, or the Internet, a server is utilized. Servers effectively integrate and manage resources and data commonly used by all users and eliminates redundant storage of identical data over users' computer systems.

The operating system and application programs of a server are commonly installed and stored in a hard drive of the server. The installation and setting of hardware parameters normally require a lot of time. Besides, these operating system and application programs require a large amount of storage space of the hard drive, increasing the hardware requirement and related cost. In circumstances when the server is accessing the hard drive, a power failure or illegal operations will likely lead to a system crash or failure. If system failure occurs, the time and man-hours are wasted in the recovery of the system. In a worse case scenario, the system will have to be reinstalled completely and the cost of the loss of important data and the cost of recovering the system are incalculable.

SUMMARY OF THE INVENTION

It is therefore an object of the invention to provide a method for the embedding of the operating system and application programs into a memory apparatus. When the system is installed with the memory apparatus embedded with the operating system and application programs according to the invention, it reduces much of the time of installation and setting for the operating system and application programs. Besides, a shorter period of time, within a minute, is required to boot up a system installed with the memory apparatus as compared to a system that uses the hard drive for storing the operating system. Since the operating system and the application programs are embedded and installed into the memory apparatus, the system will not be damaged even if power failure or illegal operations occur. The size of the memory apparatus is much smaller than if stored in the hard drive, resulting in a large amount of the memory space of the hard drive being available. Moreover, it has the advantage of the fast execution of the operating system and application programs, thus providing efficient and convenient installation, setting, and usage of the system for the users and the administrators.

The invention achieves the above-identified objects by providing a method for embedding an operating system and an application program into a memory apparatus, such as a flash ROM. The operating system, such as the UNIX operating system, includes a boot file and a run control (RC) program and the method includes the steps as follows. First, source codes of the operating system are processed for obtaining a crunch file of the operating system by applying a crunch technique. The crunch file of the operating system is then compiled, resulting in an executable file of the operating system which is then compressed into a system compression file. Next, eliminating unnecessary comments and settings from the source codes of the application program, a compact version of the application program is obtained. After that, a program storage file is mounted as a mount point through a virtual node technique. Next, the compact version of the application program is copied to the mount point. The program storage file is then compressed into a program compression file. After that, the memory apparatus is formatted and the boot file, the system compression file, and the program compression file are copied to the formatted memory apparatus.

Additionally, the run control program is modified so that the run control program is able to check whether the file system of the memory apparatus is functioning properly: if not, correcting the file system; to set the memory apparatus to be read only; to mount the program compression file in the memory apparatus as a program storage directory through the virtual node technique; to automatically detect and install a hard disk drive and to automatically format the hard disk drive if the hard disk drive is not formatted; and then to automatically detect and set a network interface card and to set a parameter of the network interface card according to slots available in sequence.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
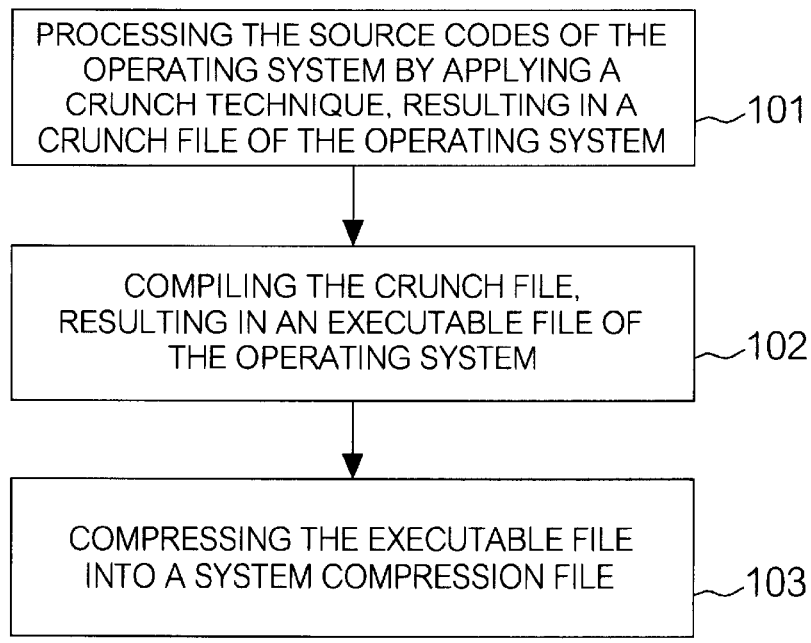
FIG. 1 is a flowchart of the method for producing image file of an operating system according to a preferred embodiment of the invention.

In a general operating system, there are many subdirectories under the root directory dedicated to specific purposes. For instance in the UNIX operating system, the /boot directory includes the files for the booting of the system, the /kernel directory keeps the files of the operating system, and the /usr directory is for storing the application programs. According to the object of the invention, the embodiment in the following is to provide a method for the embedding of the operating system and application programs included in the directories /kernel and /usr into a memory apparatus. Referring to FIG. 1, it shows the flowchart of the method for producing a root image of the operating system according to the preferred embodiment of the invention. In the embodiment, the FreeBSD operating system is taken as the exemplary operating system. As shown in FIG. 1, the method begins at step 101. The source codes of the FreeBSD operating system are processed by applying a crunch technique, resulting in a crunch file of the operating system. The crunch technique is a method for obtaining an executable file into which a number of independent programs are combined.

The original source codes of the FreeBSD operating system include tens or hundreds of programs, each of which is an independent program having its calls to certain procedures and functions. Most of the procedures and functions being called in the programs are common to these programs. After the compilation of their source codes, function-identical procedures and functions are contained in each program that has calls to them, i.e. there is executable code of identical procedures and functions in each program having calls to them. This makes the size of the operating system large. To reduce the size of the operating system, all of the programs of the operating system are processed by applying the crunch technique, resulting in a crunch file of the operating system. In the crunch technique, the independent programs, in source code level, are changed into the source codes in the form of procedures or functions and they are then inserted into the crunch file of the operating system. After compiling the crunch file of the operating system, only one piece of the common procedures or functions called by the independent programs exists in the executable file of the crunch file of the operating system, thus saving a lot of space occupied by the operating system as compared to that without applying the crunch technique.

Proceeding with the method for producing the root image of the operating system, at step 102, the crunch file is compiled, resulting in an executable file of the operating system. The method then proceeds to step 103 where the executable file is compressed into a system compression file.

Figure 2:
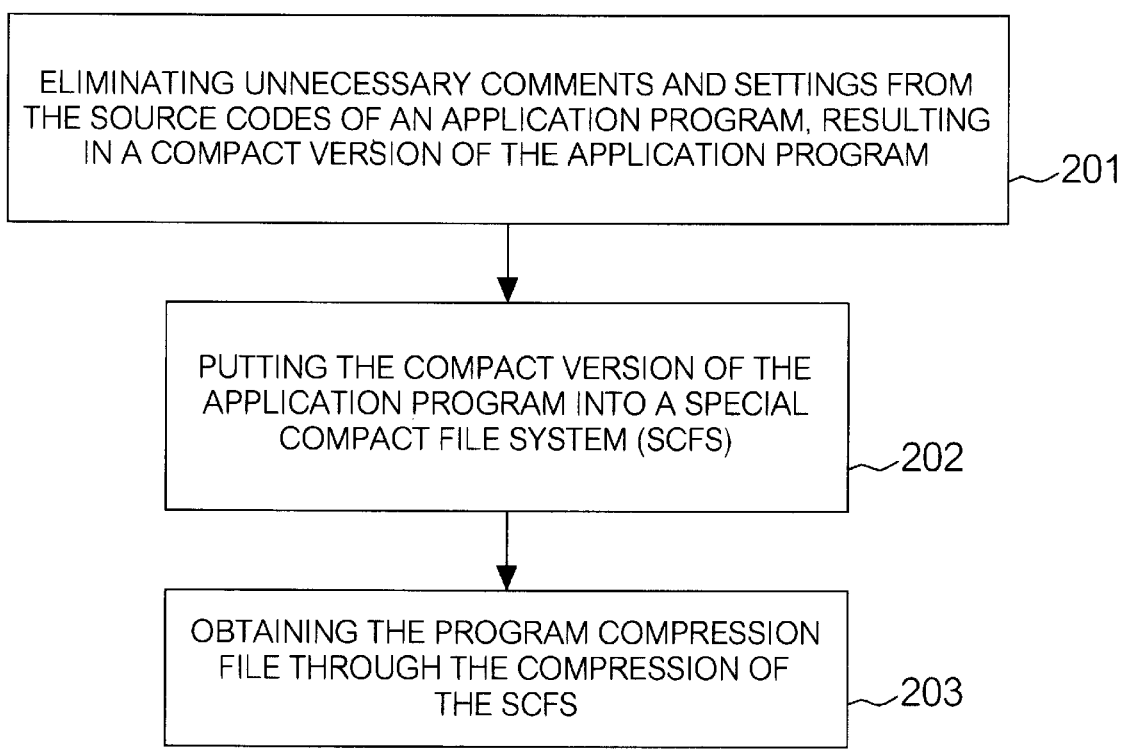
FIG. 2 is a flowchart of the method for producing image file of an application program according to the preferred embodiment of the invention.

FIG. 2 is the flowchart of the method for producing the image file of application programs. For a server providing network and management services for users, application programs are service programs such as the proxy server, file server, post office protocol (POP) 3 server, simple mail transfer protocol (SMTP) server, world wide web (WWW) server, file transfer protocol (FTP) server, and domain name service (DNS) server. The method begins at step 201 where unnecessary comments and settings are eliminated from the source codes of an application program, such as a WWW server, resulting in a compact version of the application program. At step 202, the compact version of the application program is put into a special compact file system (SCFS). Similarly, other service program such as the SMTP server can be processed and put into the SCFS. At step 203, through the compression of the SCFS, the program compression file is obtained.

Figure 3:
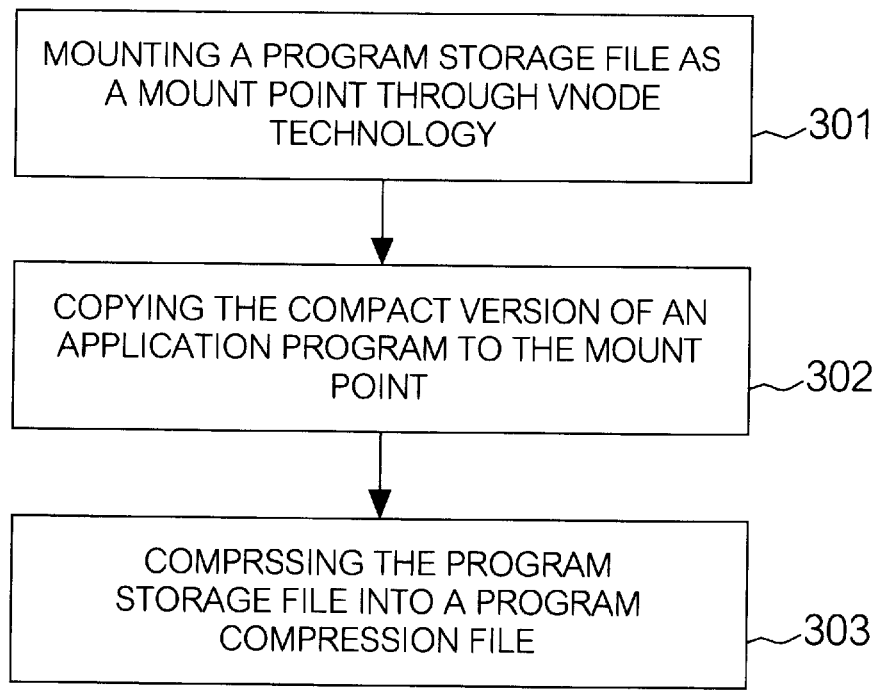
FIG. 3 is a flowchart of the method for producing special compact file system of an operating system according to the preferred embodiment of the invention.

Referring now to FIG. 3, it is the flowchart of the method for producing the SCFS. At step 301, applying virtual node (VNODE) technology, a file, called the program storage file, is created and mapped as a mount point. At step 302, the compact version of an application program is copied to the mount point. At step 303, the program storage file is compressed into a program compression file, and hence the program compression file is obtained as in the step 203 of FIG. 2.

Figure 4:
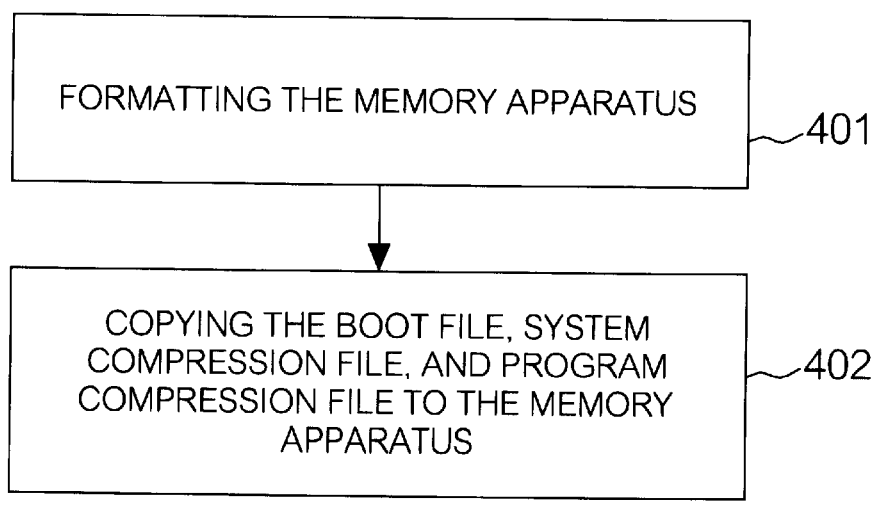
FIG. 4 is a flowchart of the method of putting the operating system and application programs into the memory apparatus according to the preferred embodiment of the invention.

FIG. 4 is the flowchart of the method of putting the operating system and application programs into the memory apparatus, such as flash read only memory (flash ROM), according to the preferred embodiment of the invention. The method begins at step 401 where the memory apparatus is formatted in the file system of the FreeBSD operating system. Next, at step 402, the boot file of the operating system originally located at the /boot directory, the system compression file, and program compression file are respectively copied to the memory apparatus. Generally, the memory apparatus can be a non-volatile memory device such as flash memory or any other rewritable non-volatile memory device.

Figure 5:
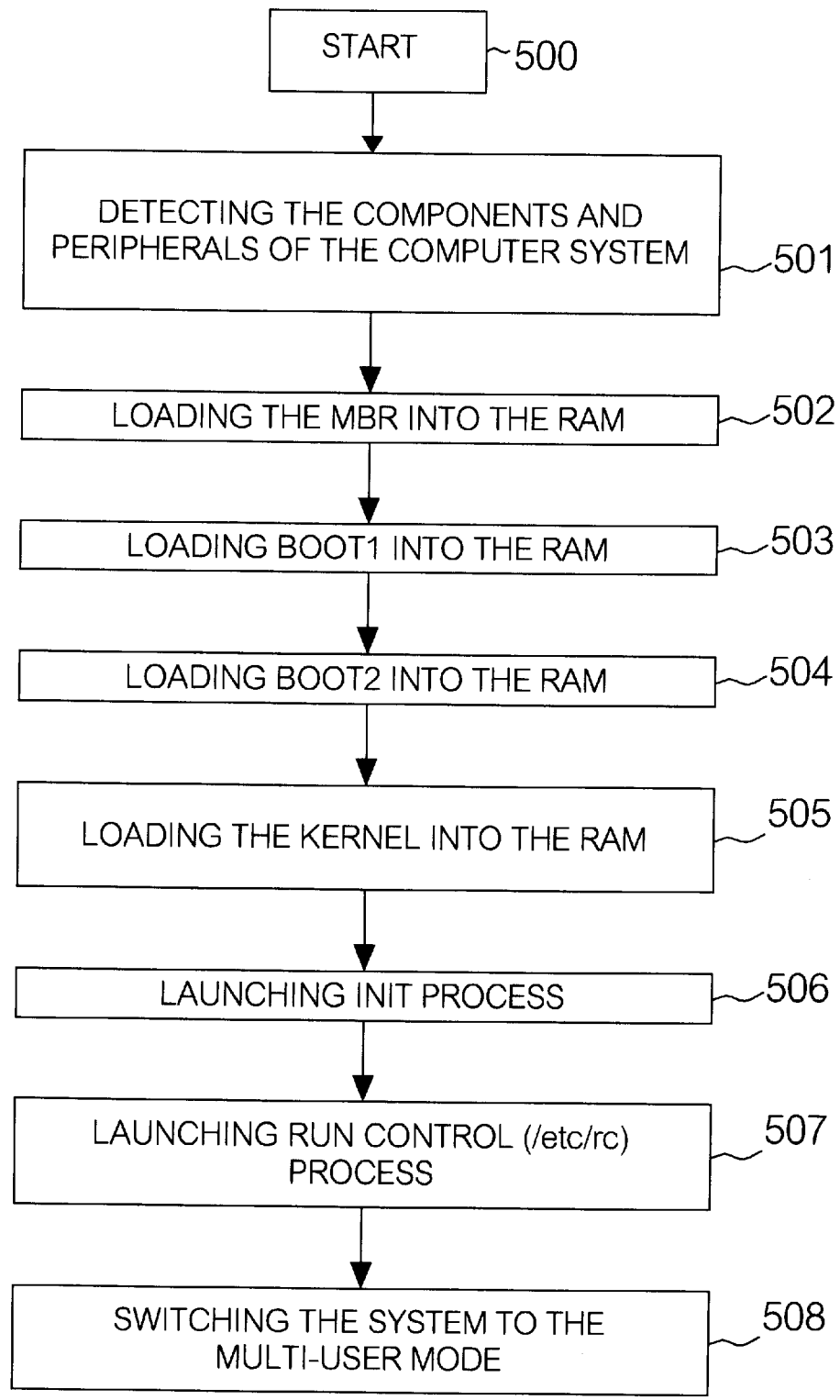
FIG. 5 (Prior Art) is a flowchart of conventional method for the booting of a computer system.

Referring now to FIG. 5, it illustrates the flowchart of conventional method for the booting of a computer system. First, as shown in step 501, the basic input output system (BIOS) of the computer system starts to detect and test the components and peripherals of the computer system. At step 502, the BIOS loads the master boot record (MBR) into the random access memory (RAM), in which the MBR stores the information regarding the partition of the storage disks and which of the disks is bootable. During the process of step 502, the BIOS gives the control of the system to the MBR. The method proceeds to step 503. In the bootable storage disk, there are two regions closely related to the booting of the system: one is the first sector, namely boot 1, of the bootable storage disk while another is the 7.5 Kbytes of data located following the boot1, namely boot2, where boot1 and boot2 are used to read the file system of the FreeBSD operating system and to interact with the system console. Therefore, at step 503, the MBR loads boot1 into the RAM while in step 504, boot1 loads boot2 into the RAM. At step 505, boot2 loads the kernel into the RAM and the control of the system is completely given to the kernel.

As shown in step 506, the kernel launches a process called init. The init process is the operating system's first process being launched and is the process of making the system enter the single user mode in which the system can be logged on with only the administrator account. The method then proceeds to step 507, where init launches rc (run control) process for detecting and installing the file system and initializing the daemon processes. Finally, as shown in step 508, the system is switched to the multi-user mode. According to the preferred embodiment of the invention, an improvement on the process in the step 507 is provided and described as follows.

Figure 6:
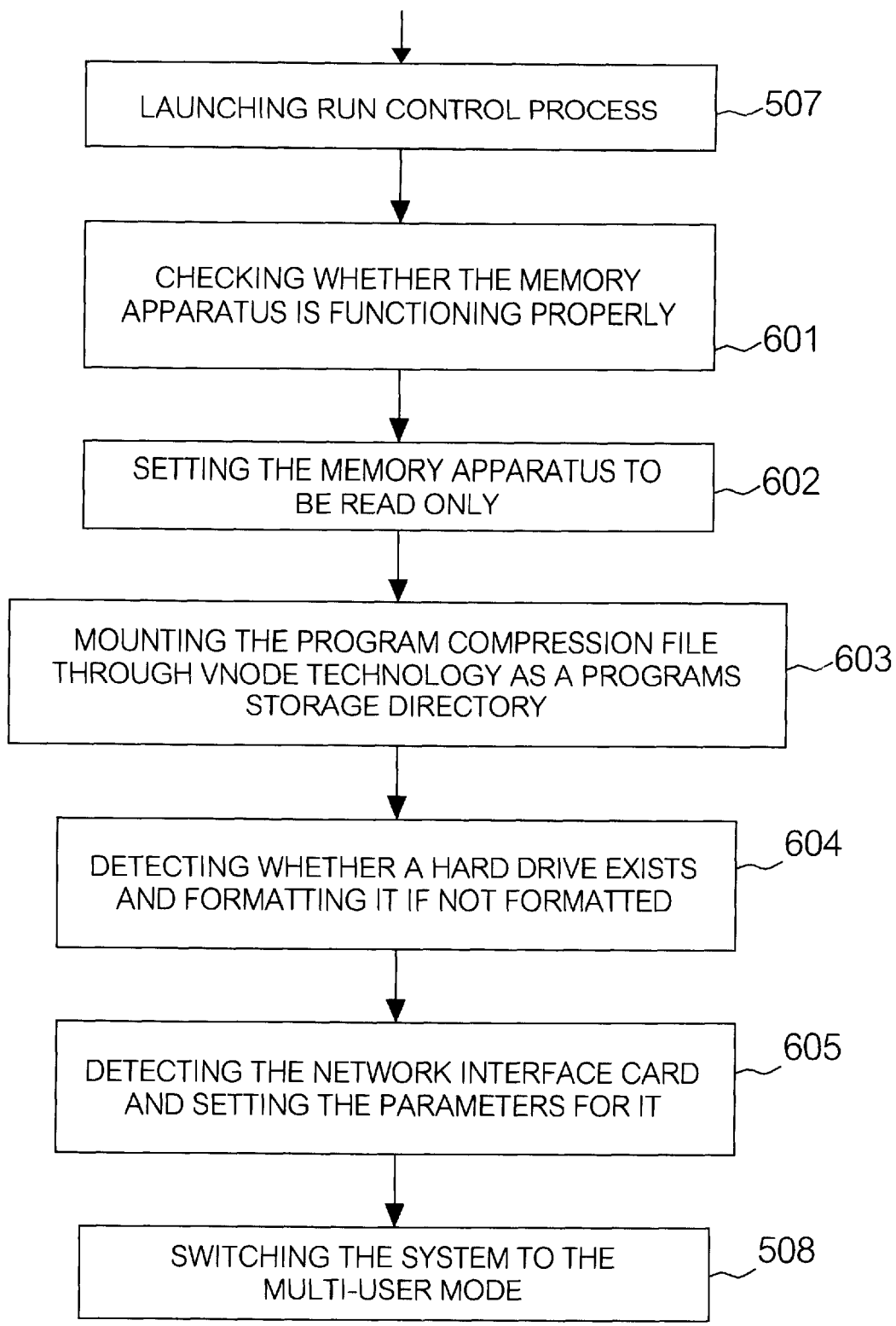
FIG. 6 is the method for the booting of a system according to the preferred embodiment of the invention in flowchart form.

In a computer system installed with the memory apparatus embedded with the operating system and application programs according to the embodiment disclosed above, the process of booting up the system is shown in a flowchart of FIG. 6. In FIG. 6, before step 507, the booting of the system proceeds as from steps 500 to 507, as shown in FIG. 5 and therefore the flowchart shown in FIG. 6 continues from step 507 for simplicity. Following that, at step 601, the proper functioning of the file system in the memory apparatus is checked. If an error of the file system is detected, the correction of the file system is to be performed. At step 602, the memory apparatus is then set to be read only, which means that data cannot be written into but can be read from the memory apparatus. Since the operating system and application programs are all stored in the memory apparatus, there is no need to write additional data into the memory apparatus, which is why the memory apparatus is to set to read only. As such, system damage caused by illegal operations or power failures as the hard disk is accessed is eliminated. At step 603, through the virtual node technology, the program compression file is mounted as a program storage directory named /usr and the existence of a hard drive is confirmed in step 604. If a hard drive is detected, it is automatically initialized and formatted if not formatted. At step 605, the operating system detects the network interface card installed into the main board of the system and reads the parameters for setting them from the file for setting parameters, /etc/rc.conf. The typical settings for a network interface card are Internet protocol (IP) address, gateway, and netmask. The settings for a number of network interface cards can be recorded in the file /etc/rc.conf. For instance, parameters of N+1 network interface cards are grouped into N+1 sections corresponding to these network interface cards. Specifically, for instance, eth1 is used for representing parameters of the first network interface card, eth2 is used for that of the second one, and eth(N+1) is for that of the (N+1)th one. If the system finds that there are several network interface cards installed in the main board of the system, the operating system will assign the settings in the file rc.conf to the corresponding network interface cards according to the slots in sequence. The operating system then follows the conventional manner that /etc/rc does as shown in step 508 to make it enter the multi-user mode.

In the flowchart as shown in FIG. 6, steps 604, the detecting and formatting of the hard drive, and 605, the detection of the network interface cards, may be interchanged leading to the identical result. To sum up, the preferred embodiment of the invention disclosed above leads to the following advantages.

1. Simplifying the installation and setting process, thus saving a lot of time for the user in installation. If errors occur during the installation, such as the careless setting of the parameters from the user, even more time is needed to correct it. Errors occur easily especially during the complicated settings of hard drives and network interface cards. In the embodiment above, the system automatically detects whether a hard drive exists. If so, the detected hard drive is mounted automatically. If the hard drive has not been formatted, the system formats the hard drive. Apart from that, the system automatically detects, installs, and completes the settings of the network interface card. Furthermore, in a system with more than one network interface card, the system sets the parameters for the network interface card successively according to the slots that the network interface cards are installed into. In this way, the installation and setting process is simplified, thus saving a lot of time.

2. Saving memory space while providing a fast booting and no system damage due to illegal operation or power failure. According to the method provided above, the processed operating system and application programs are embedded into the memory apparatus, such as the flash ROM. This design frees up vital memory space and makes the booting of a system much more rapid. Moreover, installation of the memory apparatus is also convenient since it only needs to be plugged in. System crashes due to illegal operations and power failures are also avoided.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for embedding an operating system and an application program into a memory apparatus, wherein the operating system includes a boot file and a run control (RC) program, the method comprising the steps of:

(a) processing source codes of the operating system for obtaining a crunch file of the operating system by applying a crunch technique;

(b) compiling the crunch file of the operating system resulting in an executable file of the operating system;

(c) compressing the executable file of the operating system into a system compression file;

(d) eliminating unnecessary comments and settings from source codes of the application program for obtaining a compact version of the application program;

(e) mounting a program storage file as a mount point through a virtual node technique;

(f) copying the compact version of the application program to the mount point;

(g) compressing the program storage file into a program compression file;

(h) formatting the memory apparatus;

(i) copying the boot file, the system compression file, and the program compression file to the memory apparatus; and (i) modifying the RC program so that the RC program is able:

(j1) to check whether the file system of the memory apparatus is functioning properly:
if not correcting the file system;

(j2) to set the memory apparatus to be read only:

(j3) to mount the program compression file in the memory apparatus as a program storage directory through the virtual node technique;

(j4) to automatically detect and install a hard disk drive and to automatically format the hard disk drive if the hard disk drive is not formatted; and then (j5) to automatically detect and set a network interface card and to set a parameter of the network interface card according to slots available in sequence.

2. A method according to claim 1, wherein the operating system is FreeBSD.

3. A method according to claim 3, wherein the program storage directory is the /usr directory.

4. A method according to claim 1, wherein the memory apparatus is a flash read only memory (flash ROM).

5. A method according to claim 1, wherein the parameter is an Internet protocol (IP) address.

6. A method according to claim 1, wherein the parameter is a gateway.

7. A method according to claim 1, wherein the parameter is a netmask.

8. A method according to claim 1, wherein the application program is a proxy server system.

9. A method according to claim 1, wherein the application program is a post office protocol (POP) 3 server system.

10. A method according to claim 1, wherein the application program is a simple mail transfer protocol (SMTP) server system.

11. A method according to claim 1, wherein the application program is a world wide web (WWW) server system.

12. A method according to claim 1, wherein the application program is a domain name service (DNS) server system.

13. A method for embedding a UNIX operating system and an application program into a flash read only memory (flash ROM), wherein the UNIX operating system includes a /boot directory including a boot file and a run control (RC) program, namely /etc/rc, the method comprising the steps of:

(a) processing source codes of the UNIX operating system for obtaining a crunch file of the operating system by applying a crunch technique;
(b) compiling the crunch file of the operating system resulting in an executable file of the operating system;
(c) compressing the executable file of the operating system into a system compression file;
(d) eliminating unnecessary comments and settings from source codes of the application program for obtaining a compact version of the application program;
(e) mounting a program storage file as a mount point through a virtual node technique;
(f) copying the compact version of the application program to the mount point;
(g) compressing the program storage file into a program compression file;
(h) formatting the flash ROM;
(i) copying the boot file, the system compression file, and the program compression file to the flash ROM; and
(j) modifying the RC program so that the RC program is able:
  (j1) to check whether the file system in the flash ROM is functioning properly:
    if not, correcting the file system:
  (j2) to set the flash ROM to be read only;
  (j3) to mount the program compression file in the flash ROM as a program storage directory through the virtual node technique;
  (j4) to automatically detect and install a hard disk drive and to automatically format the hard disk drive if the hard disk drive is not formatted; and then
  (j5) to automatically detect and set a network interface card and to set a parameter of the network interface card according to slots available in sequence.

14. A method according to claim 13, wherein the UNIX operating system is FreeBSD.

15. A method according to claim 13, wherein the parameter is an Internet protocol (IP) address.

16. A method according to claim 13, wherein the parameter is a gateway.

17. A method according to claim 13, wherein the parameter is a netmask.

18. A method according to claim 13, wherein the application program is a proxy server system.

19. A method according to claim 13, wherein the application program is a post office protocol (POP) 3 server system.

20. A method according to claim 13, wherein the application program is a simple mail transfer protocol (SMTP) server system.

21. A method according to claim 13, wherein the application program is a world wide web (WWW) server system.

22. A method according to claim 13, wherein the application program is a domain name service (DNS) server system.

* * * * *